May 25, 1965 K. R. KELLY ETAL 3,185,855
CONTROL CIRCUIT FOR MULTI-STATION SEQUENCING
AND LOAD POWER SEARCHING SYSTEM
Filed March 16, 1961 2 Sheets-Sheet 1

INVENTORS
KENNETH R. KELLY &
EDWARD R. FITZGERALD
BY
Alfred C Body
ATTORNEY

INVENTORS
KENNETH R. KELLY &
EDWARD R. FITZGERALD
BY

ATTORNEY

United States Patent Office 3,185,855
Patented May 25, 1965

3,185,855
CONTROL CIRCUIT FOR MULTI-STATION SEQUENCING AND LOAD POWER SEARCHING SYSTEM
Kenneth R. Kelly, Fox Chapel, and Edward R. Fitzgerald, Pittsburgh, Pa., assignors to The Ohio Crankshaft Company, Cleveland, Ohio, a corporation of Ohio
Filed Mar. 16, 1961, Ser. No. 96,222
4 Claims. (Cl. 307—35)

This invention relates to a control circuit for a system wherein several stations are operated from a single power source of limited capacity, and more particularly to a control circuit for a multi-station sequencing and load power searching system whereby the load of the stations at any one time will not exceed the capacity of the power source.

The control circuit to be described has particular adaptation to induction heating equipment, but its use is not limited thereto since it can be used with any multi-station system wherein it is desired to limit the combined operational load of the stations.

In a system comprising a plurality of induction heating stations which are to be connected at random to a power source such as a generator of a predetermined power rating, it is possible that the instantaneous total power required from the generator when more than one station is receiving power could exceed the power capacity of the generator should an additional station be connected to the generator. If such an overload were to occur, the generator overload device would be activated, resulting in only partial heating of workpiece loads already in the process of heating prior to the overload. Such workpieces would then have to be scrapped or reprocessed, which is obviously undesirable.

The control circuit subsequently described herein is intended to prevent and temporarily by-pass the application of power to a station which has been prepared for heating, but whose power demand would exceed the capacity of the generator, while allowing the application of power to a station which has also been prepared, but whose additional power requirement would not exceed the generator rating. For example, assume that a motor generator set rated at 150 kw. is the power source supplying high frequency power to five individual heating stations. Each heating station is to operate at random, and the five stations will demand power according to the following schedule:

Station No. 1, 30 kw., station No. 2, 120 kw., station No. 3, 75 kw., station No. 4, 15 kw., station No. 5, 100 kw. The total power demanded by the five stations would be 340 kw. If all five stations were prepared and called at the same time, an overload would obviously result. However, some combinations of stations drawing power at the same instant would not cause an overload, such as stations No. 1 and 2, stations No. 1, 3 and 4, stations No. 2 and 4, and stations No. 1, 4 and 5. These stations could be sequentially connected to the generator output without overload.

According to the invention, the control circuit basically comprises a rotary stepping switch, a regulated D.C. power supply, and a series of precision potentiometers or resistors in conjunction with a contact making ammeter. Each station has an individual adjustable precision potentiometer and the potentiometers are connected in parallel to each other. In series with this parallel arrangement of the potentiometers is a contact making type D.C. ammeter, the entire circuit being connected across a regulated D.C. power supply. The circuit is basically an analog measuring circuit, in that the resistance of the individual potentiometers is adjusted to a value which is proportional to the power required at each station. As each station is prepared for heating and during heating, these resistance are connected to the D.C. voltage supply, and a current which is proportional to the required power will flow through the resistor and contact ammeter. The currents flowing through the individual resistors of stations which have been prepared for or are heating, will be summed and measured by the ammeter. If the total D.C. current and resultantly the high frequency power is excessive, the adjustable high limit of the meter will be exceeded, closing the meter contact and a relay will be energized which will prevent the application of the excess of additional power. If the total analogous metering current is not excessive, the anticipated power demand will be "approved" and the station can begin its heating cycle.

It is the primary object of the invention to provide a control circuit, for an electrical system comprising a plurality of stations adapted to individually demand power from a common source such as a generator, whereby the total power demand at any instant cannot exceed the rated capacity of the power source or generator.

Another object of the invention is to provide a control circuit, for an electrical system as described above and wherein the power source is provided with an overload device, whereby overloading of the power source and resultant actuation of the overload device is prevented.

Another object of the invention is to provide a control circuit for an induction heating system comprising a plurality of heating stations adapted to be operated from a single high frequency power source of limited power capacity, whereby the combined rated power demand of the heating stations at any instant cannot exceed the capacity of the power source.

Another object of the invention is to provide, in an induction heating system comprising a plurality of heating stations, a control circuit whereby only partial heating of stations in operation will be prevented to avoid possible scrapping or reprocessing of parts being heated at such stations.

The invention may take physical form in certain parts and arrangements of parts, the preferred embodiment of which will be described in the specification and illustrated in the accompanying drawing which forms a part hereof and wherein.

Figure 1:
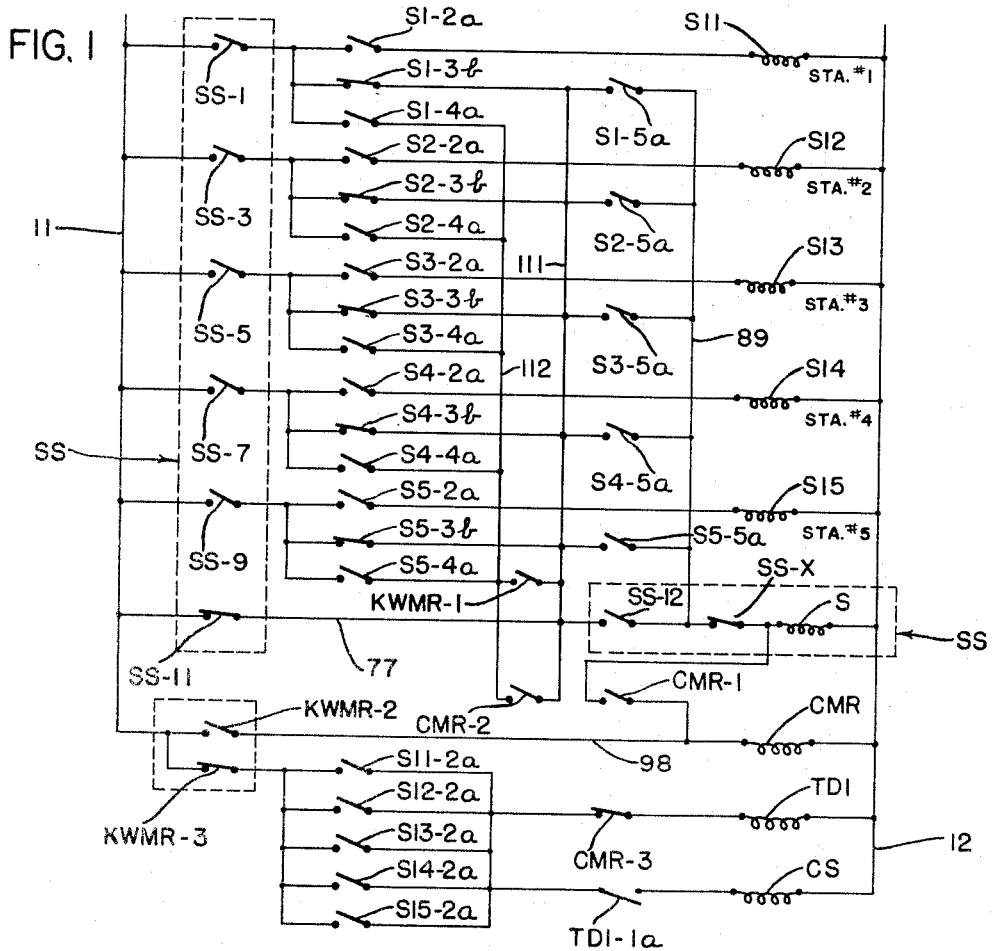
FIG. 1 is a wiring diagram of a portion of the control circuit including certain of the stepping switch contacts.
Figure 2:
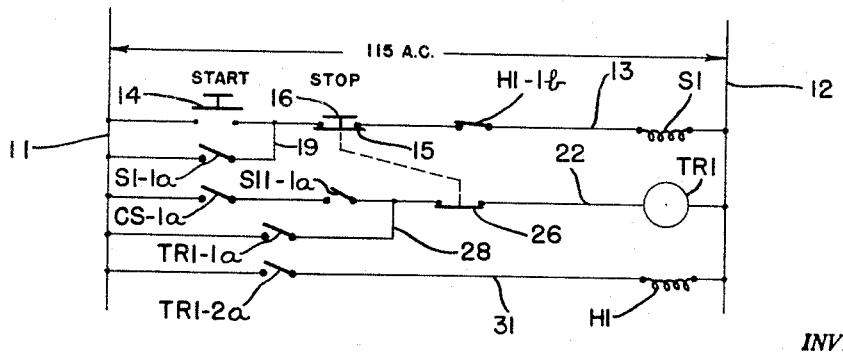
FIG. 2 is a wiring diagram of the heat control circuit at a typical heating station.

Referring now to the drawings wherein the showings are for the purpose of illustration only, and not for the purpose of limiting same, FIG. 2 shows the heat control circuit for a typical heating station with the power leads 11 and 12 from an alternating current source providing about 115 volts across the leads, it being understood that one of these heat control circuits is provided for each station in the system. Connected in series by a line 13 across the power leads is a pushbutton type "start" switch 14, contacts 15 of a pushbutton type "stop" switch 16, the normally closed contacts H1–1b of relay H1, and a relay S1. A line 19 connects contacts S1–1a of relay S1 to line 13 in parallel with switch 14. Also connected across the power leads 11 and 12 is a line 22 which connects in series the normally open contacts CS–1a of relay CS shown in FIGURE 1, the normally open contacts S11–1a of relay S11 also shown in FIGURE 1, contacts 26 of stop switch 16, and a timer relay TR1. A line 28 connects the normally open contacts TR1–1a of timer relay TR1 to line 22 in parallel with contacts CS–1a and S11–1a of relays CS and S11, respectively. A third line 31 connected across the power leads connects normally open contacts TR1–2a of relay TR1 in series with the relay H1. Merely for illustration, the invention will be described in connection with a system having five heating stations and station No. 1 will be used to describe the control circuit as applied to a station prepared for heating. Accordingly, it will be assumed that the heat control circuit so far described is for station No. 1.

In preparing the station for heating, switch 14 is manually closed and since contacts H1–1b are closed when the station is neither heating nor prepared for heating, this energizes relay S1 which closes contacts S1–1a to hold the relay when switch 14 is released. When relay S1 is energized, it opens normally closed contacts S1–3b and closes normally open contacts S1–2a, S1–4a and S1–5a shown in FIGURE 1, as well as contacts S1–6a shown in FIGURE 4. In a manner to be described, the actuation of these contacts causes a stepping switch, the contacts of which are enclosed by broken lines and identified generally as SS in FIGURES 1 and 4, to move to the station prepared for heating and either "accept" or "reject" the station. If the station is "accepted," contacts CS–1a and S11–1a shown in FIGURE 2 are closed, thereby energizing the timer relay which closes its contacts TR1–1a and TR1–2a shown in FIGURE 2. Closing of contacts TR1–1a holds the timer circuit and closing of contacts TR1–2a energizes the relay H1 and the heating cycle for this station starts since contacts H1–2a in FIGURE 4 now close. At the completion of the heating cycle, the timer relay TR1 opens contacts TR1–2a to deenergize relay H1 and open contacts TR1–1a to deenergize the timer relay TR1. The manner of actuating contacts CS–1a and S11–1a and the function of relay H1 will be subsequently described.

Figures 3, 4:
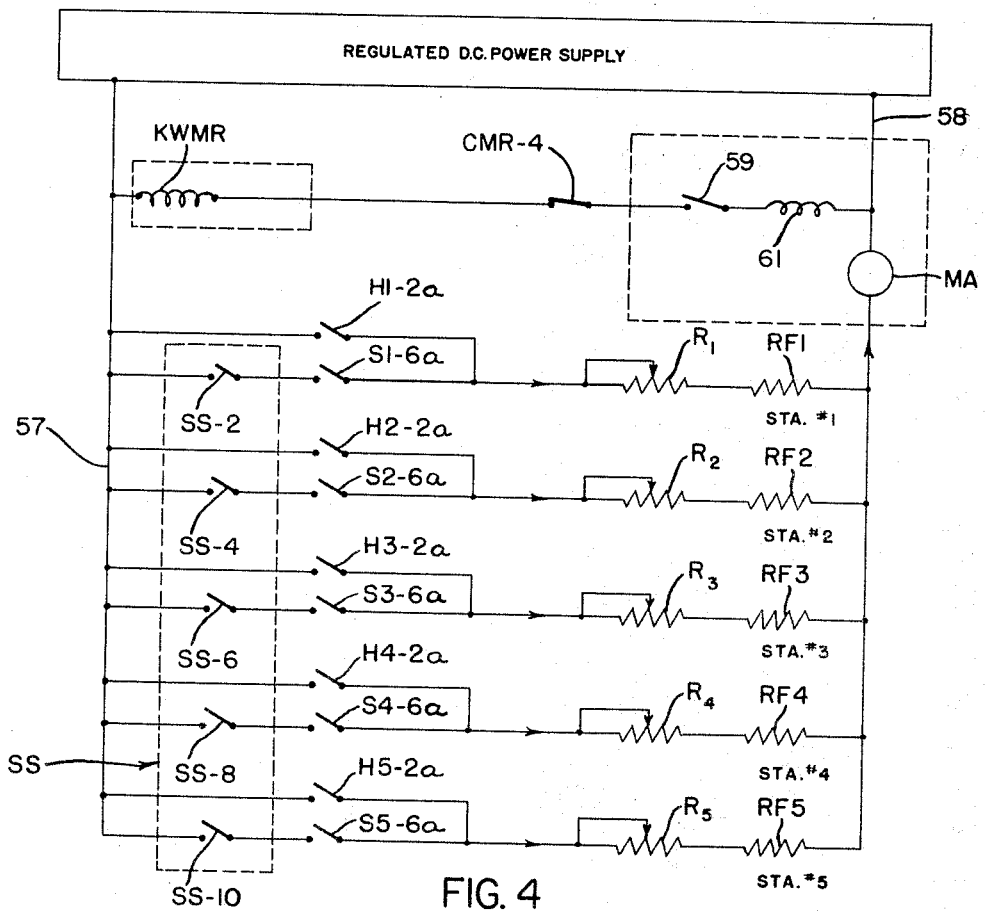
FIG. 3 is a diagram showing the contact sequence of a preferred type of stepping switch.
FIG. 4 is a wiring diagram of a current monitoring system with provision for rejecting loads that would overload the power source.

Referring to FIGURE 4, each of the five stations illustrating the invention has an individual adjustable precision potentiometer as indicated at $R_1$, $R_2$, $R_3$, $R_4$ and $R_5$. With reference to station No. 1, the potentiometer $R_1$ is connected in series with fixed resistor RF1 as well as the normally open contacts H1–2a of relay H1 shown in FIGURE 2. In parallel with contacts H1–2a are the normally open contacts S1–6a of relay S1 shown in FIGURE 2 as well as contacts SS–2 on the stepping switch SS. In a similar manner, the potentiometer $R_2$ for station No. 2 is connected in series with fixed resistor RF2 as well as contacts H2–2a of the relay H2 for that station, the latter relay corresponding to relay H1 for station No. 1. Likewise, in parallel with contacts H2–2a for station No. 2 are contacts S2–6a of a relay S2 which corresponds to relay S1 for station No. 1 shown in FIGURE 2 and contacts SS–4 on the stepping switch SS. The arrangement for stations 3, 4 and 5 is identical to that already described, as will be understood.

In series with this parallel arrangement of potentiometers is a contact-making type direct current ammeter MA, the entire circuit being connected across the leads 57 and 58 of a regulated direct current power supply. This circuit is basically an analog measuring circuit in that the resistances of the individual potentiometers are adjusted to values which are proportional to the power required by each station. As each station is prepared for heating and while they are heating, these resistances are connected to the direct current voltage supply, and a current which is proportional to the required power will flow through the individual resistors whose stations have been prepared for or are heating and will be summed and measured by the ammeter. If the total direct current and, therefore, the high frequency power is excessive, the adjustable high limit of the meter will be exceeded, closing the meter contact 59 and energizing a kilowatt measuring relay KWMR through the normally closed contacts CMR–4 of relay CMR shown in FIGURE 1. When relay KWMR is energized, it will prevent the application of the excessive additional power, as will hereinafter be described. If the analogous metering current is not excessive, however, the anticipated power demand will be "approved" and the station can begin its heating cycle. A locking coil 61 for meter contact 59 and the contacts CMR–4 are connected in series with the kilowatt measuring relay KWMR across the leads 57 and 58, substantially as shown.

If the contact S1–6a for station No. 1 is closed in response to closing the "start" switch 14, the station will be prepared for heating, but the heating cycle will not start until contacts SS–2 shown in FIGURE 4 are closed. As previously explained in connection with FIGURE 2, energization of relay S1 at station No. 1 closes contacts S1–6a shown in FIGURE 4. When station No. 1 is prepared for heating or demands power as indicated by closing of the contacts S1–6a, the stepping switch SS is automatically moved to said station and thereby closes the switch SS–2. If the added power demand does not now result in excessive current flow through ammeter MA, this station will be "accepted" and contacts H1–2a will close, meaning that relays S11 and CS are energized at this time. If the added power demand will overload the generator as indicated by an excessive current flow through the ammeter, this station will be "rejected" and the stepping switch SS will automatically move to the next station but will return to station No. 1 if another station completes its heating cycle. The means for sequencing the stations and determining the load power requirements at any time will now be described.

The stepping switch SS is preferably of the rotary type. Switches of this type are well known and a preferred type for use in connection with the present invention comprises a cam shaft movable to a plurality of relatively rotated positions by energizing a solenoid. The shaft carries a plurality of cam discs adapted to actuate sets or pairs of contacts whereby various circuits may be opened and closed as the switch advances from one rotary position or station to another. The invention is illustrated as applied to five heating stations and the switch has a "home" position so that in the present instance, the switch would have a minimum of six different rotary positions, although it could have a multiple of this number such as twelve or eighteen positions. In addition to actuating the switches SS–2, SS–4, SS–6, SS–8 and SS–10 in the regulated direct current power supply circuit shown in FIG. 4, the stepping switch SS actuates contacts indicated at SS–1, SS–3, SS–5, SS–7, SS–9 and SS–11 in the alternating current control circuit shown in FIG. 1.

Referring to FIGURE 1, a line 77 across the power leads 11 and 12 connects contacts SS–11 in series with the normally closed contacts SS–12, the normally closed contacts SS–X and the solenoid S of the rotary stepper switch SS. At the "home" position of the stepping switch SS, contacts SS–11 will be closed, contacts SS–12 will be opened, and contacts SS–X will be closed. The stepping switch SS remains at its "home" position until a station is prepared for heating or until a station which has been heating completes its cycle and another station is demanding power. The contacts SS–X are normally closed but open every time solenoid S is energized. Thus, the solenoid S is deenergized each time the stepping switch SS advances from one station to another. Each of the stations is provided with normally closed contacts, the contacts for station No. 1 being indicated at S1–3b. As was mentioned above, the contacts S1–3b are connected in series with contacts SS–1 as well as contacts S1–5a across power leads 11 and 12. The contacts S1–5a, S2–5a, S3–5a, S4–5a, and S5–5a are connected in parallel to a line 89 which is connected in series with contacts SS–X and the solenoid coil S. It will be apparent that if the stepping switch SS is at any station, the solenoid S can be energized to move the stepping switch to the next station. For example, if the stepping switch is at station No. 3, a circuit can be completed through closed contacts SS–5, S3–3b, line 111, contacts SS–12, SS–X and solenoid S. Contacts S3–3b remain closed as long as there is no demand for heat or power at station No. 3, meaning that the circuit described functions only to advance the stepping switch to station No. 4. However, in the event that station No. 3 is prepared for heating, contacts S3–3b are opened by relay S3 for that station. Although relay S3 is not shown in the drawings, it would correspond to relay S1 for station 1 shown in FIGURE 2. As shown in FIGURE 1, the solenoid S may be energized without closing any one of the contacts S1–5a to S5–5a, inclusive, through line 111 which is connected to each of the contacts S1–3b to S5–3b, inclusive, and to contacts SS–12, the arrangement being such that when contacts SS–1 for station 1 are closed, for example, the solenoid S will be energized when contacts SS–X, SS–12, and S1–3b are closed. The solenoid S may also be energized through line 112 when, for example, contacts SS–1 and S1–4a of station No. 1 are closed, and contacts KWMR–1 of relay KWMR shown in FIGURE 4 or contacts CMR–2 of relay CMR are closed.

The relay KWMR shown in FIGURE 4 also operates normally open contacts KWMR–2 and normally closed contacts KWMR–3 shown in FIGURE 1, the arrangement being such that when the relay KWMR is energized, contacts KWMR–2 will close whereas contacts KWMR–3 will open. Contacts KWMR–2 are connected across power leads 11 and 12 in series with the contact meter relay CMR which is adapted to concurrently operate the contacts indicated at CMR–1, CMR–2, and CMR–3 in the alternating current control circuit shown in FIGURE 1 as well as contacts CMR–4 in the direct current power supply circuit shown in FIGURE 4.

Normally closed contacts KWMR–3 are adapted to be connected through a group of contacts S11–2a, S12–2a, S13–2a, S14–2a and S15–2a to a time delay relay TD1 through contact CMR–3. In addition, the contacts KWMR–3 are adapted to be connected through the aforesaid five contacts to a cycle start relay CS through contacts TD1–1a of time delay relay TD1.

The manner in which the stepping switch SS operates in conjunction with the circuits described will now be explained. It is understood that each of the five stations shown for illustration have a heat control circuit as shown in FIGURE 2 and if a greater or lesser number of stations is desired, the heat control circuit for each station would be similar. First, assume that none of the five stations have been prepared for heating and that the stepping switch SS is at its "home" position. In this case, all of the contacts shown in the direct current power supply circuit of FIGURE 4 with the exception of contacts CMR–4 will be open and no current will be flowing through the potentiometers $R_1$, $R_2$, $R_3$, $R_4$ and $R_5$ to the contact making ammeter MA. Referring to the alternating current control circuit illustrated in FIGURE 1, the contacts S1–3b, S2–3b, S3–3b, S4–3b, and S5–3b inclusive, will be closed. Also, contacts SS–11 of the SS switch and contacts SS–X will be closed; but since contacts SS–12 are open, no current will flow to solenoid S through line 77. The contacts operable by stepping switch SS are indicated in chart form in FIGURE 3.

Now assume that station No. 1 is prepared for heating. It will be noted that at each station in the alternating current control circuit shown in FIGURE 2, six contacts are provided in addition to the contacts operable by the stepping switch SS. Relative to station No. 1, the contacts are indicated at H1–1b, S1–1a, S11–1a, CS–1a, TR1–1a and TR–2a. When the pushbutton "start" switch 14 for station No. 1 is temporarily pressed, relay S1 shown in FIGURE 2 is energized. Energization of this relay at any station causes four contacts to close and one contact to open at such station. When said relay for station No. 1 is energized, the contacts S1–2a, S1–4a, and S1–5a in the alternating current control circuit of FIGURE 1 are closed and contacts S1–3b of this circuit are opened.

Also, contacts S1–6a in the direct current power supply circuit of FIGURE 4 are closed. Since contacts SS–11 are now closed with the stepping switch SS in its "home" position and contacts SS–X normally closed, a circuit energizing solenoid S is completed as follows across the power leads 11 and 12; contacts SS–11, line 77, line 111, contacts S1–5a, line 89, and contacts SS–X. Energizing solenoid S moves the stepping switch from its "home" position to a position at station No. 1. When the stepping switch SS moves to position No. 1, it closes contacts SS–1 and SS–12 in the alternating current control circuit of FIGURE 1 as well as contacts SS–2 of the direct current power supply circuit shown in FIGURE 4. It also opens contacts SS–X which deenergizes the solenoid S. With station No. 1 prepared for heating, contacts S1–2a, S1–4a, and S1–5a are closed while contacts S1–3b are opened. When the stepping switch SS closes contacts SS–1 at station No. 1, the solenoid S will not be reenergized to advance the stepping switch until either contacts S1–3b close after the heat cycle has begun or when the kilowatt meter relay contacts KWMR–1 close if the power is not approved by the measuring circuit. It was previously pointed out in describing the direct current power supply circuit that kilowatt meter relay KWMR would only be energized if an additional station which had been prepared for heating would overload the generator.

First assume that preparing station No. 1 for heating would not overload the generator. Since contacts S1–2a are now closed with station No. 1 prepared for heating and contacts SS–1 are closed when the stepping switch moves to station No. 1, relay S11 at this station is energized. Energization of relay S11 causes contacts S11–2a to close, which completes a circuit through the closed contacts KWMR–3 and CMR–3 to energize the time delay relay TD1.

Contacts KWMR–3 which are operable by relay KWMR in the direct current power supply circuit remain closed so long as there is no overload on the generator. Contacts CMR–3 remain closed unless relay CMR is energized. After a lapse of about one second, relay TD1 closes contacts TD1–1a and this interval gives sufficient time to determine that the station is "approved" for starting its heating cycle. Closing of the time delay contacts TD1–1a energizes the cycle start relay CS. Relay CS then closes contacts CS–1a in the cycle start circuit (FIGURE 2) or station No. 1, thereby energizing the timer relay TR1 which closes contacts TR1–1a and TR1–2a through contacts S11–1a which were closed by relay S11. Closing of contacts TR1–2a energizes relay HI. Energization of relay HI, in turn, closes contacts HI–2a in the direct current power supply circuit of FIGURE 4 and maintain metering current through ammeter MA during the heating cycle. Relay HI concurrently opens contacts HI–1b shown in FIGURE 2 and thereby deenergizes relay S1.

When relay S1 is deenergized, contacts S1–3b close to complete a circuit through contacts SS–1, line 111, contacts SS–12 and contacts SS–X to energize solenoid S and advance the stepping switch to station No. 2. If it is assumed that station No. 2 is not prepared for heating, contacts S2–2a, S2–4a, and S2–5a of the alternating current control circuit for this station remain open and contacts S2–3b remain closed. Also, contacts H2–2a and S2–6a in the direct current power supply circuit for station No. 2 remain open.

At station No. 2 then, the solenoid S is reenergized as follows: from power lead 11 through contacts SS–3, contacts S2–3b, line 111, contacts SS–12, contacts SS–X and through the solenoid coil S to power lead 12. The solenoid S then moves the stepping switch SS to its position at station No. 3. This results in opening of contacts SS–3 and SS–4 at station No. 2.

If it is assumed that no other stations have been prepared for heating, the stepping switch SS returns to its "home" position in the same manner as it moves from station No. 1 to station No. 2 and so on. The stepping switch SS will stop at its "home" position since when moved to this position, contacts SS-11 close and contacts SS-12 open and remain at such position until another station is prepared for heating. At the completion of the heating cycle, the timer relay TR1 opens contacts TR1-1a and TR1-2a, thereby deenergizing relay H1 which stops the flow of measuring current for station No. 1 through ammeter MA and stopping the timer.

The above description applies to a station which has been "accepted" for heating, but in the event a station which has been prepared for heating would overload the generator, the following steps occur. This would only occur if one or more other stations are in the process of heating or have already been "approved" to heat, but have not yet begun. In this event, the metering current will be excessive and the ammeter contact 59 will close, thereby energizing the kilowatt meter relay KWMR and this causes contacts KWMR-1 to close, thereby energizing the solenoid S of the stepping switch SS through contacts SS-1, assuming that station No. 1 has been prepared for heating, contacts S1-4a, line 112, contacts KWMR-1, line 111, contacts SS-12 and contacts SS-X. Relay KWMR concurrently opens contacts KWMR-3 to prevent the time delay relay TD1 from being energized and prevent its contacts TD1-1a from closing. Thus, the cycle starter relay CS cannot be energized and heat cannot be applied. At the same time, relay KWMR closes contacts KWMR-2 which energizes the contact meter reset relay CMR which seals itself by closing contacts CMR-1 until the solenoid S has been energized and the interrupter contacts SS-X have been opened. It is understood that contacts SS-X are opened each time the stepping switch SS is moved to a new station to stop the switch at such station until the solenoid is again energized. Relay CMR concurrently opens contacts CMR-4 in the direct current power supply circuit of FIGURE 4, thereby deenergizing the coil of relay KWMR and locking coil 61 to thereby unlock and open meter contacts 59. Relay CMR also concurrently closes contacts CMR-2 to insure the solenoid S can be fully energized even if relay KWMR opens due to the interlocking action between this relay and contacts CMR-4. Also, contacts CMR-3 are concurrently opened by relay CMR assuring that time delay contacts TD1-1a cannot time out. Thus, relay CMR controls contacts CMR-1, CMR-2, and CMR-3 of the alternating current control circuit and contacts CMR-4 of the direct current power supply circuit. When the stepping switch SS has moved to a position between station No. 1 and station No. 2, relay CMR will be deenergized through opening of the interrupter switch SS-X. The stepping switch will continue to rotate as described and will continue to return to position No. 1 until the power is "approved" and it will stop at any other position which is prepared, meter that position and "approve" or "disapprove" that power requirement.

While there has been described herein and illustrated in the accompanying drawing a specific presently-preferred embodiment of this invention, it is to be understood that various modifications, omissions and refinements which depart from the disclosed embodiment may be adopted without departing from the spirit and scope of this invention.

Having thus described our invention, we claim:

1. A control circuit for an electrical system comprising a plurality of stations adapted to individually demand power from a first common power source of limited capacity whereby the instantaneous total demand of the stations will not exceed the capacity of the power source, said control circuit comprising a second power source, a resistor for each station adjusted to a value proportional to the power required at said station, a contact making ammeter, said resistors being connected in parallel to each other and in series with said ammeter across said second power source, means for causing a current to flow through a station resistor and the ammeter when power is demanded at said station whereby said current will be proportional to the power required at the station, the ammeter being adapted to measure in sum the currents flowing through the station resistors at any instant, said ammeter contact being operable by excessive current flow through the ammeter to prevent the application of additional power from said first power source, a stepping switch movable to each station adapted to selectively complete circuits at a station in accordance with the current flow through the ammeter accepting and rejecting the application of power at said station, and means responsive to power demands at a station for automatically moving the stepping switch to said station.

2. The control circuit as described in claim 1 wherein there is a relay adapted to be energized by closing of said ammeter contact, a first switch means controlling the application of power at a station demanding power, and a second switch means operable by energization of said relay adapted to cause the stepping switch to advance from said station to a succeeding station without operating the first switch means.

3. The control circuit as defined in claim 1 wherein a solenoid is provided for operating the stepping switch, an interrupter switch is provided in the solenoid circuit adapted to momentarily stop the stepping switch at each station, a circuit controlling the application of power at each station, and a time delay switch in said power control circuit whereby power cannot be applied at a station until a sufficient time has elapsed to allow the metering phase of the circuit to "approve" or "reject" the application of power.

4. A control circuit for a multi-station sequencing and load power searching system, said circuit comprising an adjustable precision potentiometer for each station, each potentiometer being adjusted to a value proportional to the power required at its station, a contact making ammeter, said potentiometers being connected in parallel with each other, and in series, with the ammeter across a power source, means for causing a current to flow through a station potentiometer when a station demands power whereby the ammeter will measure in sum the currents flowing through the potentiometers at any instant, a circuit controlling the application of power at each station, a stepping switch automatically movable to a station demanding power and adapted to energize the power control circiut and permit the application of power at said station, means responsive to excessive current flow through the ammeter preventing the stepping switch from energizing the power control circuit when it moves to a station demanding power, means for automatically moving the stepping switch to a station demanding power and previously denied power when another station ceases to demand power.

References Cited by the Examiner

UNITED STATES PATENTS 2,641,716   6/53   Hyer et al. _____ 307—35
2,843,759   7/58   Roots _____ 307—34

RALPH D. BLAKESLEE, *Primary Examiner.*

ORIS L. RADER, *Examiner.*